United States Patent
Marine et al.

[11] Patent Number: 5,841,984
[45] Date of Patent: Nov. 24, 1998

[54] METHOD OF ASSIGNING TRANSACTION IDENTIFIERS AND SYSTEM FOR IMPLEMENTING THE METHOD

[75] Inventors: Souheil Marine, Paris; Pierre Arnaud, Marcoussis; Benoît Paul-Dubois-Taine, Bourg la Reine; Louis Bouveret, Paris, all of France

[73] Assignee: Alcatel Cit, Paris, France

[21] Appl. No.: 667,933

[22] Filed: Jun. 24, 1996

[30] Foreign Application Priority Data

Jun. 23, 1995 [FR] France .................................. 95 07576

[51] Int. Cl.$^6$ ...................................................... G06F 17/00
[52] U.S. Cl. ......................................................... 395/200.56
[58] Field of Search .......................... 395/200.56, 200.7, 395/200.48, 673

[56] References Cited

U.S. PATENT DOCUMENTS 5,680,548 10/1997 Trugman et al. .................. 395/200.56

FOREIGN PATENT DOCUMENTS

0457117A2 11/1991 European Pat. Off. ..
0578406A1 1/1994 European Pat. Off. ..

Primary Examiner—Ellis B. Ramirez
Attorney, Agent, or Firm—Sughrue, Mion, Zinn, Macpeak & Seas, PLLC

[57] ABSTRACT

A method of assigning transaction identifiers assigns an identifier that is unique to each transaction, each transaction operating on data distributed across various stations. The method determines a first field of the identifier, having either a temporary value identifiable as such and unique to the station executing the application process that requested opening of the transaction if opening of the transaction is requested during an initialization phase or a value assigned by a first manager process specific to the station executing the requesting application process if opening of the transaction is requested after the initialization phase. The method also determines a second field having either a temporary value identifiable as such and unique to the set of stations if the opening of the transaction is requested during the initialization phase or a value assigned by a second manager process common to the set of stations if opening of the transaction is requested after the initialization phase. The method also determines a third field by incrementing by one unit a counter specific to the requesting process. Applications include telecommunication network control systems.

8 Claims, 10 Drawing Sheets

METHOD OF ASSIGNING TRANSACTION IDENTIFIERS AND SYSTEM FOR IMPLEMENTING THE METHOD

BACKGROUND OF THE INVENTION

1. Field of the Invention

The invention concerns a method of assigning a unique identifier to each transaction in a system including a non-volatile memory and a plurality of stations and a system for implementing the method.

2. Description of the Prior Art

Applications of the invention include telecommunication network control systems. In a system of this kind each station executes a plurality of application processes. A set of read operations and/or write operations requested by an application process in the same request is called a transaction. The application processes read and/or write data after requesting a data manager to open a transaction. The data manager responds by assigning the application process an identifier for that transaction. The application process then uses that identifier to access the data. When the read and/or write has terminated, the application process requests the data manager to close the transaction. The data manager process must ensure that a set of read and/or write operations effected as part of the same transaction is either entirely validated or not validated at all when the transaction is closed. Modifications to the data made by a transaction become effective, and therefore visible outside the transaction, only after the transaction is closed successfully.

These properties of the transactions must be assured despite faults that can affect the stations, the process that requested the opening of transactions or the entire system. Failure of a process leads to the loss of the data that it contains in its own memory. Failure of a station leads to the loss of all the data that it holds in its memory and all the processes being executed at the time in that station. However, some data may be backed up in a non-volatile memory such as a secure disk memory.

A data manager uses a recovery protocol for coherently terminating a set of transactions that are open or in the process of being closed at the time of failure of the process that requested their opening. This type of protocol is based on the following principle: the effects of any such transaction are validated if the effects of the transaction persist in at least one station or in the non-volatile memory and if there is no trace whatsoever of any decision to close that transaction taken by the application process that requested it to be opened and perceived by at least one station or by the non-volatile memory. Otherwise the effects of the transaction concerned are not validated. A recovery protocol of this kind therefore requires unambiguous recognition of a transaction that was opened by a process that has failed.

The data managers currently used in telecommunication network control systems do not distribute transactions between a plurality of stations. In other words, each transaction can concern only data stored in the station in which the application process requesting the opening and then the closing of the transaction is executed. This limitation on the possibilities of a transaction has the advantage of greatly simplifying the recovery process following failure of a station and of not requiring transaction identifiers that are uniquely defined spatially and temporally. Since each transaction operates only on local data, there is no drawback if more than one transaction happen to have the same identifier, provided that the transactions concerned are not open in the same station.

Telecommunication network control systems are having to support more and more services and these services are becoming more and more complex. To provide more complex services it is necessary to envisage a data manager distributed across a plurality of stations, but meeting real time operation and fault tolerance constraints which are of primary importance in telecommunications. Database management systems capable of managing data distributed across a plurality of stations exist already. However, these databases cannot be transposed to telecommunications since the structure of the data and the storage means employed, usually disks, do not offer sufficient performance for real time operation.

If a transaction were able to access data distributed across a plurality of stations, the recovery protocol would require transaction identifiers uniquely defined both spatially and temporally. A transaction identifier uniquely defined temporally is required in the following case: if a new instance of a process is activated after the failure of another instance, the transactions opened by these two instances of the same process must be distinguishable from each other in order for the transactions to be recovered correctly.

A priori, an identifier comprising three fields should unambiguously distinguish all transactions open in the entire system:

One field can distinguish the transactions opened successively by the same application process, if it contains a counter value incremented for each transaction opening.

One field can distinguish the transactions opened by different application processes in the same station.

One field can distinguish transactions opened by application processes executed in the various stations constituting the system.

Unfortunately this is no longer true after failure and restarting of the station in which the application process that requested the opening of the transaction concerned is executed, since the counter value distinguishing the successive transactions is lost. This value is reset to zero when this station is restarted. A counter value can then be assigned that is already in use in the identifier of a transaction that has not yet been closed.

The aim of the invention is therefore to propose a method of assigning to each transaction an identifier which remains uniquely defined temporally and spatially despite process, station or system failures. This method must be applicable in a system in which each application process can request the opening of transactions on data distributed across a plurality of stations and must meet real time operation constraints.

SUMMARY OF THE INVENTION

The invention consists in a method of assigning a unique identifier to each transaction in a device including a non-volatile memory and a plurality of stations, each station executing a plurality of application processes; all the stations and the non-volatile memory being connected by a communication network assuring the integrity of communications;

which method consists in:

determining a first field of said identifier, having:

either a temporary value identifiable as such and unique to the set of stations, if opening of the transaction is requested during a first initialization phase;

or a value assigned by a first data manager process common to all the stations if the opening is requested after said first initialization phase; said first manager process further implementing a transaction recovery protocol known in itself;

determining a second field having:
  either a temporary value identifiable as such and unique to the station executing the requesting application process that requested the opening of the transaction if the opening is requested during a second initialization phase;
  or a value assigned by a second data manager process, said second data manager process being specific to the station that is executing the requesting process, if the opening of the transaction is requested after said second initialization phase;
determining a third field by incrementing by one unit a counter value specific to said requesting process;
wherein said value assigned by said first manager process is the result of incrementing by one unit a first counter value specific to said first manager process and backed up in said non-volatile memory, said counter value being restored after each failure of the station executing said first manager process;
wherein said value assigned by said second manager process is the result of incrementing by one unit a second counter value specific to said manager process;
wherein said first initialization phase is completed for a given second manager process when it has set up a link with said first manager process; and
wherein said second initialization phase is completed for a given application process when it has set up a link with said second manager process specific to the station in which said application process is executed.

The above method distinguishes a plurality of operating periods for each application process: a first initialization phase during which the instance of the second manager process specific to the station at which the application process is executed is initialized, and a second, independent initialization phase during which the application process in question is initialized. For as long as either or both of these two initialization phases has not finished, the method does not assure transaction identifiers uniquely defined temporally, but prevents the lack of a unique definition affecting the coherence of the data. To avoid inconsistency between the stations it is sufficient to prohibit a transaction from accessing data other than that located in the station in which the transaction was opened, or modifying data located in that station and also stored in the non-volatile memory.

The method of the invention makes the transactions that were opened during at least one of the two initialization phases of the station identifiable by assigning to the first field and to the second field of each transaction identifier a temporary value that can be identified as such. To determine if a transaction is entitled to access data stored in stations other than the station in which the transaction was opened, it is sufficient to determine if the first or second field of the identifier of that transaction contains a temporary value.

After the two initialization phases have finished the transaction identifiers opened by a given application process are uniquely defined temporally, even after failure and restarting of the first manager process, on the one hand because the counter value specific to the first manager process is restored from the non-volatile memory, but more importantly because the completion of the reconnection of the links between the first manager process and all the second manager processes guarantees that the recovery protocol can recover absolutely all transactions that might have been affected by the failure of a station.

In a preferred embodiment, said first initialization phase for a given second data manager consists in:
  said second manager process requesting the setting up of a link between said second manager process and said first manager process, said request being accompanied by an indicator for distinguishing whether a link of such kind has already been set up since the last starting of said second manager process;
  setting up a link of this kind; and
  if said indicator indicates that said link is set up for the first time:
    incrementing by one unit said counter value stored in the memory specific to said first manager process;
    backing up the incremented value by writing it in said non-volatile memory; and then
    supplying the counter value to the second manager process that requested a link.

In the above method, the indicator distinguishes two situations:
  In the situation in which the station executing the second manager process restarts after a failure that has erased its memories, that station must be regarded as a new station in order to distinguish transactions opened after the restart, which could otherwise have the same identifiers as transactions opened earlier.
  In the situation in which the station has been operating correctly but was momentarily isolated from the first manager process by a failure of the station executing the first manager process, there is no need to regard it as a new station since there is no risk of identical identifiers having been assigned to transactions opened before the failure and transactions opened after the failure, since the memory content of the station concerned has not been affected.

In a preferred embodiment, the second initialization phase for a given application process consists in:
  said application process requesting the setting up of a link between said application process and said second manager process that is specific to the station in which said application process is executed;
  setting up a link of this kind; and
  incrementing by one unit the counter value specific to said second manager process.

The invention also consists in a system for implementing the above method.

The invention will be better understood and other features will emerge from the following description and the accompanying drawings.

BRIEF DESCRIPTION OF THE DRAWINGS

FIG. 2 shows the starting up of the stations and the restoration of the counter value specific to the first manager process;
FIG. 3 shows the second manager process initialization phase in a secondary station;
FIG. 4 shows the second manager process initialization phase in a main station;
FIG. 5 shows the initialization phase of two application processes;
FIG. 6 shows the assignment of transaction identifiers after the end of the initialization phases.

DETAILED DESCRIPTION OF THE PREFERRED EMBODIMENT

Figure 1:
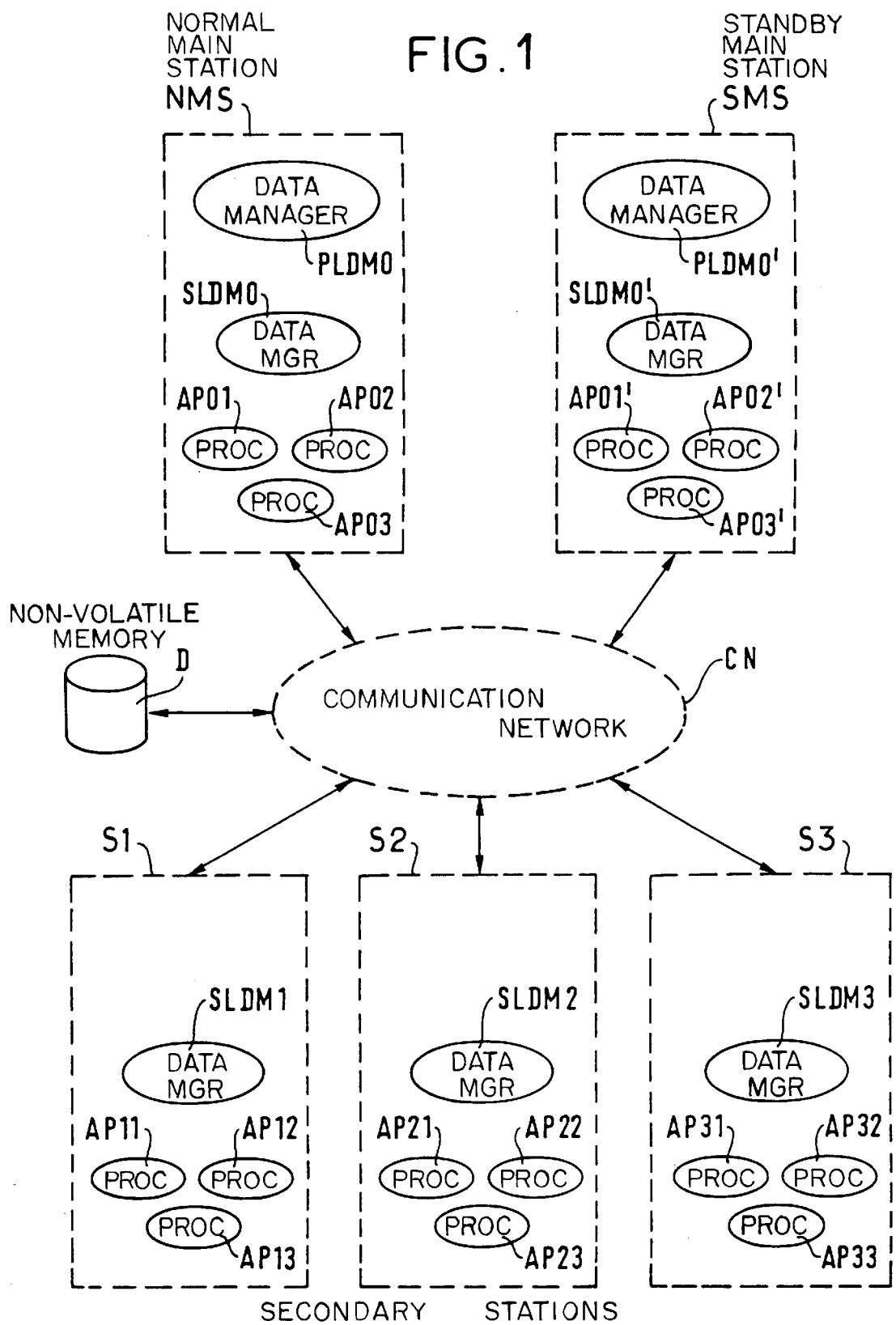
FIG. 1 is a block diagram of one embodiment of a system for implementing a method in accordance with the invention.

FIG. 1 is a block diagram of one example of a system for implementing a system in accordance with the invention, including:

a normal main station NMS and a standby main station SMS, the latter being used only if the normal main station fails;

three secondary stations S1, S2, S3;

a secure non-volatile memory D comprising a disk or a set of disks and a disk controller;

a communication network CN connecting all the stations and the non-volatile memory D via secure bidirectional links.

The non-volatile memory D is secured so that its content is not degraded by partial or total failure of the entire system. It stores a replica of some of the data tables that are distributed across and used in the stations and the counter value specific to the first data manager process. The method of securing the non-volatile memory D and the communication network CN will not be described in detail since it is conventional in the art.

The data distributed across the various stations is managed by a data manager that is itself distributed and comprises:

a single first data manager process PLDM0 for the entire system executed in the normal main station NMS if the latter is operating and replaced by a replica PLDM0' executed by the standby main station SMS if the normal main station NMS fails;

second data manager processes SLDM0, SLDM0', SLDM1, SLDM2, SLDM3 respectively executed in the stations NMS, SMS, S1, S2 and S3;

application processes AP01, AP02, AP03 executed in the normal main station NMS and replicated in the form of application processes AP01', AP02', AP03' in the standby main station SMS;

application processes AP11, AP12, AP13 executed in the secondary station S1;

application processes AP21, AP22, AP23 executed in the secondary station S2; and application processes AP31, AP32, AP33 executed in the secondary station S3.

The first manager process PLDM0 and its replica PLDM0' employ a recovery protocol assuring coherent completion of all transactions that are open or in the process of being closed when failure of a station interrupts execution of the application process that requested opening of that transaction. A recovery protocol of this kind is described in French patent application n° 94 13900, for example.

An effect of a protocol of this kind is that any transaction is either completely executed or non executed at all. A protocol of this kind requires unambiguous recognition of each transaction that was opened by an application process that fails if the station supporting it fails. In the case of transactions distributed across a plurality of stations this lack of ambiguity must be both spatial and temporal. If an application process fails after opening a transaction, it must be possible to distinguish transactions opened before the failure and transactions opened after the failure by a new instance of the same application process, since the recovery of the transactions opened by the defunct instance may still be in progress when the new instance starts.

Each application process includes an interface that is an integral part of the application process and enables it to access the services of the data manager by setting up a link with the second manager process located in the same station as the application process in question. This interface is not shown in FIG. 1. The starting and the stopping of this interface are concomitant with the starting and the stopping of the application process which contains this interface.

Each time an application process requests the opening of a transaction, the second manager process in the same station assigns to the requesting application process a transaction identifier with four fields:

a first field SID for distinguishing the station in which the requesting application process is executed from all the other stations of the system;

a second field AID for distinguishing the requesting application process from all the application processes executed in the same station;

a third field TN for distinguishing a transaction from all the other transactions opened by the same application process; and a fourth field for detecting errors.

Figure 2:
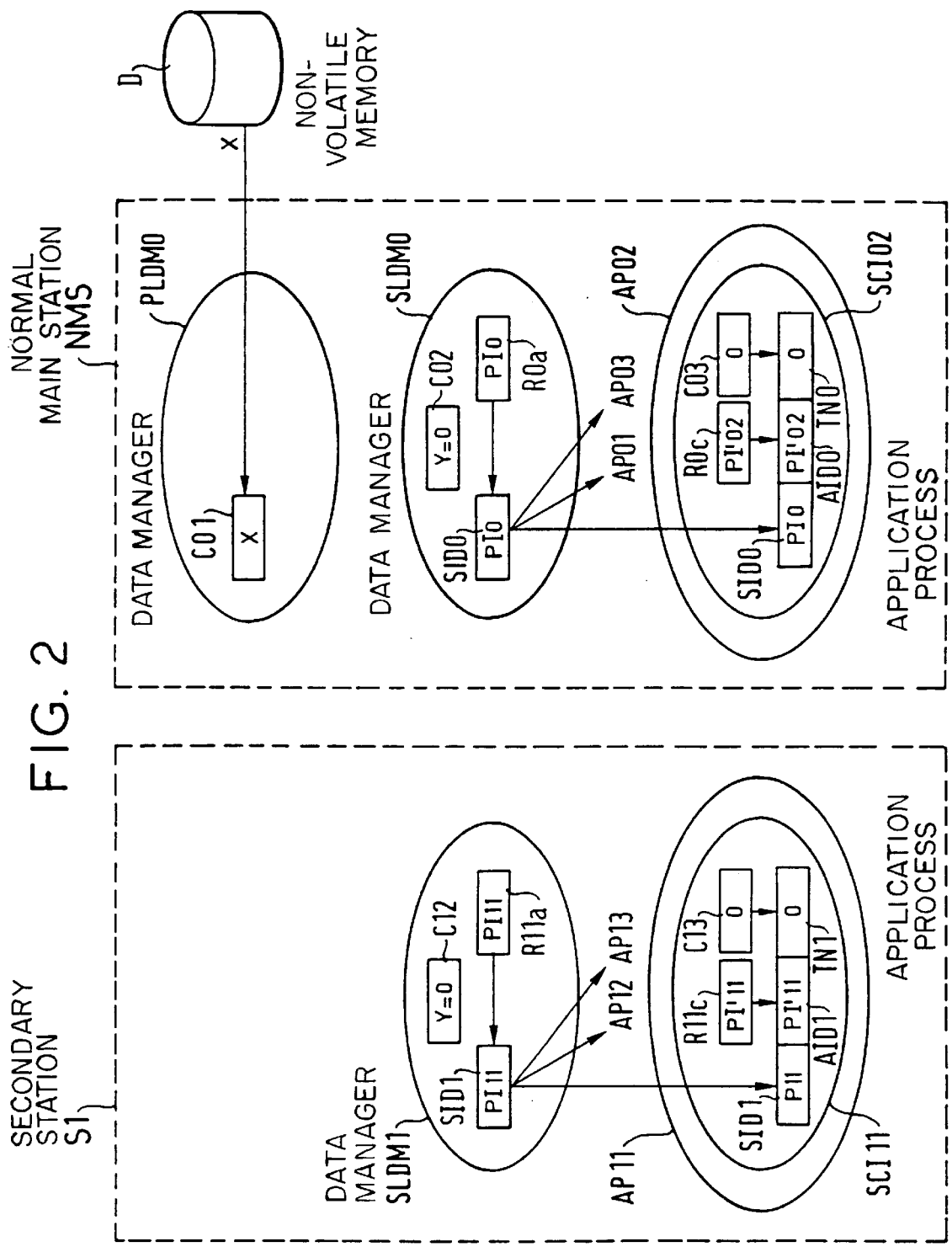
FIGS. 2 through 6 show part of this example system and illustrate various steps in starting up the system.

FIG. 2 is a diagrammatic representation of part of this example system, namely the secondary station S1 and the normal main station NMS, illustrating the starting up of stations. By way of example, a single application process is shown in each station: AP11 in station S1 and AP02 in station NMS. The implementation is similar in the other application processes, not shown, in these two stations and also in the other secondary stations of the system.

Starting or restarting of the main station NMS entails transferring from the non-volatile memory D to a memory C01 specific to the first manager process PLDM0 a counter value X that was saved the last time the main station (normal or standby) was stopped. The counter value X is incremented subsequently to assign a value to the first field SID for distinguishing each of the stations. Pending the completion of an initialization phase of the second manager process SLDM0, starting or restarting of the main station NMS further consists in resetting to zero a counter value Y that is specific to the station NMS and that is stored in a memory C02 specific to the manager process SLDM0 in the station NMS. This counter value Y is not backed up to guard against failure.

Likewise, starting or restarting the secondary station S1 consists in resetting to zero a counter value that is specific to the station S1 and that is stored in a memory C12 specific to the second process SLDM1 and located in the station S1. This counter value is not backed up to guard against failure.

Transactions can be opened at any time, including during starting or restarting of one or more stations.

An initialization phase of a second manager process SLDM consists in setting up a link with the first manager process common to all of the system, in this instance the process PLDM0.

Provided that no link has been set up between the second manager process SLDM of a station and the first manager process PLDM0 of the main station, the value assigned to the first field SID of a transaction identifier is a temporary value, identifiable as such, which can be a fixed number assigned to the processor of the station and different from those assigned to the other processors in order to achieve the necessary spatially unique definition. For example, in the second station S1 a temporary value PI11 is read in a register R11a to constitute the temporary value of the first field SID1 of the transaction identifiers for the transactions opened by application processes executed in the station S1. This temporary value is broadcast by the second manager process SLDM1 to the application processes AP11, AP12, AP13. In the normal main station NMS a temporary value PI0 is read in a register R0a to constitute the first field SID0 of the transaction identifiers assigned to the transactions opened by application processes executed in the station NMS. This temporary value is broadcast by the second manager process SLDM0 to the application processes AP01, AP02, AP03.

Each application process has an interface SCI enabling it to access the services of the data manager. When a station is started or restarted, an initialization phase of each application process executed in that station consists in setting up a link between its interface and the second manager process executed in the same station.

Provided that no link has been set up between this application process and this second manager process, the value assigned to the second field AID of a transaction identifier is a temporary value, identifiable as such. This temporary value is determined from a characteristic distinctive of the application process that contains the interface concerned. It is, for example, a serial number assigned by the operating system of the station concerned. This number achieves the spatially unique definition required at the station.

For example, in the interface SCI11 of the application process AP11, a temporary value PI'11 is read in a memory R11c specific to the interface SCI11 to constitute the second field AID1 of a transaction identifier. In the interface SCI02 of the application process AP02, a temporary value PI'02 is read in a memory R0c specific to the interface SCI02 to constitute the second field AID0 of a transaction identifier.

The initialization phase of each of these application processes further consists in resetting to zero a counter value in a memory specific to its interface. This counter value is incremented subsequently to constitute the value assigned to the third field TN of a transaction identifier. It distinguishes the various transactions opened by the same application process. For example, in the application process AP11 the interface SCI11 includes a memory C13 that contains a counter value which is reset to zero. In the application process AP02 the interface SCI02 includes a memory C03 that contains a counter value that is reset to zero.

At the end of this first step of starting or restarting a station, an application process can request the opening of a transaction and obtain a transaction identifier in which the first three fields have the following values:

PI11, PI'11, 1 for a first opening request from the application process AP11.

PI0, PI'02, 1 for a first opening request from the application process AP02.

The value of the third field is incremented for each new transaction opening request in the station concerned.

A protocol that is known in itself implemented by the first manager process PDLM0 or by its replica PDLM0' recovers transactions that are open or in the process of being closed at the time a secondary or main station fails. However, this protocol cannot be implemented if no link has been set up between the application process that opened the transaction to be recovered and the second application process executed in the same station and if no link has been set up between the second manager process and the first manager process.

To prevent data inconsistencies as the result of the impossibility of implementing this protocol, the data manager prohibits a transaction from reading or writing data that is not in the station in which the application process which requested the opening of the transaction is executed if the transaction was opened before the end of the initialization phase of the requesting application process and completion of the initialization phase of the second manager process executed in the same station. This prohibition applies equally to modification of data in this station but also backed up in the non-volatile memory D.

A transaction that is opened under these conditions is recognizable by virtue of the fact that its identifier contains at least one temporary value.

The data manager therefore provides a reduced service for transactions opened under these conditions but guarantees in this way that the transaction identifiers are uniquely defined, regardless of station failures that may occur during the initialization phases.

Figure 3:
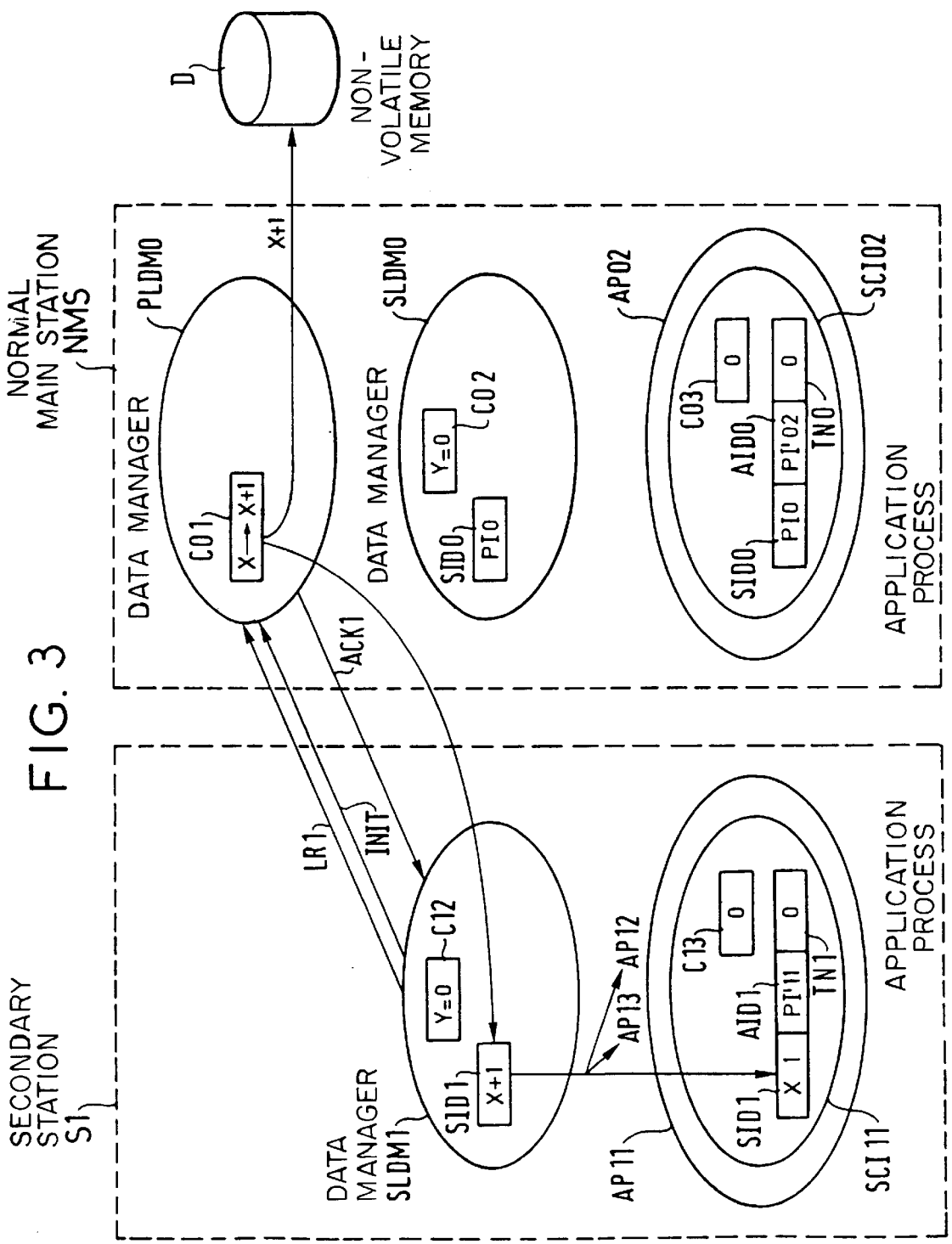

FIG. 3 shows the same part of this example system, illustrating completion of the initialization phase of the second manager process SLDM1. The latter sends to the first manager process PLDM0 of the main station in service a request LR1 to set up a link between the first manager process PLDM0 and the second manager process SLDM1, this request being accompanied by an indicator INIT indicating that no link of this kind has been set up already since the last starting or restarting of the second manager process SLDM1. The request LR1 causes the first manager process PLDM0 to increment the counter value X stored in the memory C01. The incremented value X+1 is backed up immediately by writing it into the non-volatile memory D. An acknowledgement ACK1 is then sent to the second manager process SLDM1, together with the counter value X+1 which from this time is the value assigned to the first field SID1 of the transaction identifiers for the transactions opened by the application processes AP11, AP12, AP13 attached to the second manager process SLDM1. The value X+1 is broadcast to the interfaces of each of these application processes AP11, AP12, AP13.

This second manager process initialization step would be strictly identical in the case of restarting the station S1 after it failed, causing a link set up with PLDM0 to be broken. On the other hand, it would be different if the link with PLDM0 were down due to failure of the main station NMS. These two situations are described below with reference to FIG. 10 and FIGS. 7 through 9, respectively.

Figure 4:
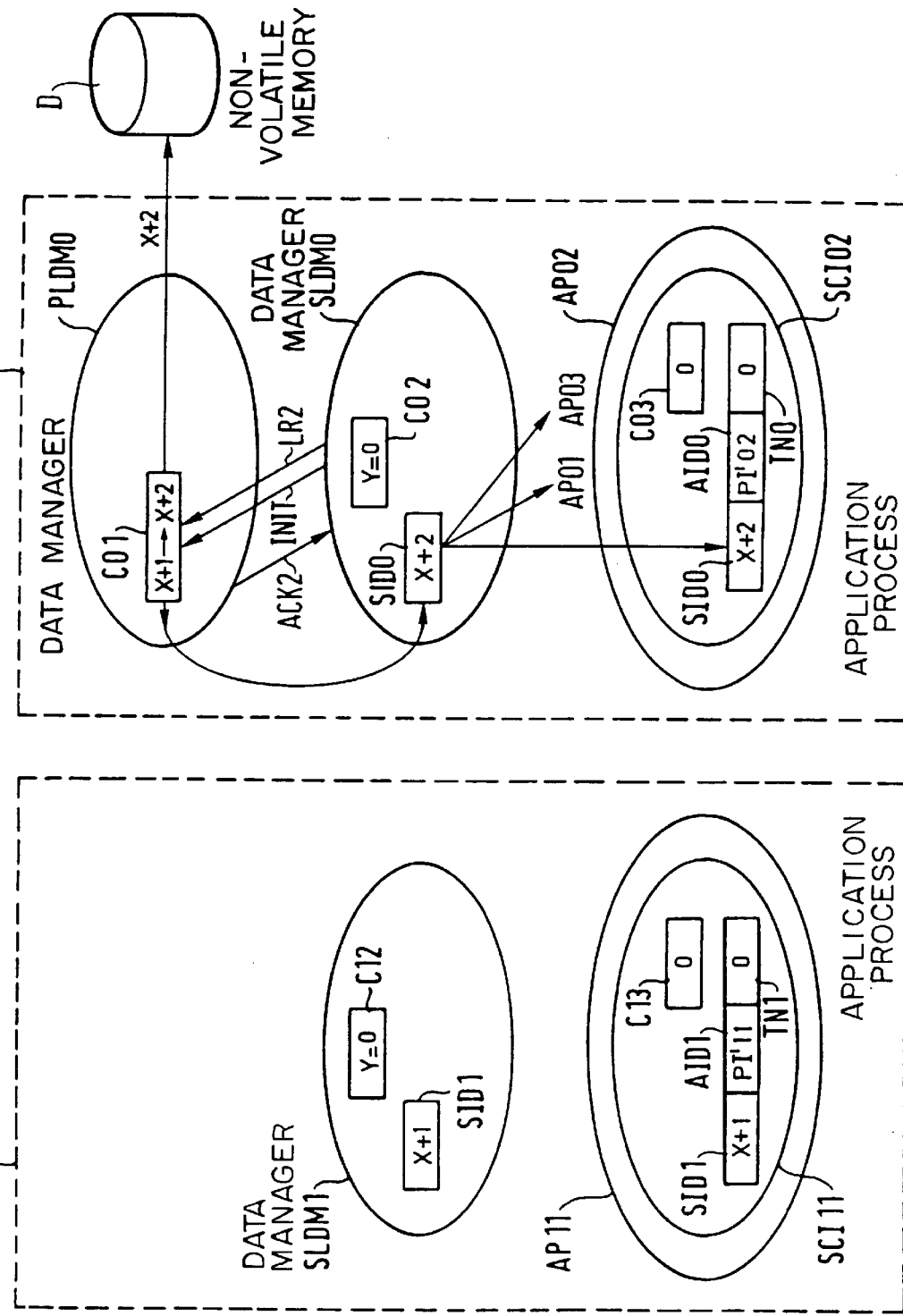

FIG. 4 is a diagrammatic representation of the same part of this example system showing completion of the initialization phase of the second manager process SLDM0 of the normal main station NMS. In this example the counter value stored in the memory C01 of the first manager process PLDM0 is equal to X+1 at the time the second manager process SLDM0 sends a link set-up request LR2 accompanied by an indicator INIT indicating that this is the first time this link will have been set up since the last starting or restarting of the second manager process SLDM0.

This request LR3 causes incrementing by one unit of the counter value X+1 in the memory C01 of the manager process PLDM0. The incremented value X+2 is immediately backed up in the non-volatile memory D and is then sent to the manager process SLDM0 with an acknowledgement ACK2 indicating that a link has been set up.

From this time the value X+2 is assigned to the manager process SLDM0 to constitute the value of the field SID0. It distinguishes all transactions opened by application processes executed in the station NMS. This value constitutes the first field SID0 of the identifiers assigned to these transactions. The value X+2 is broadcast from the process SLDM0 to the interfaces of each of the application processes AP01, AP02, AP03 of the station NMS. In particular, this value is received by the interface SCI02 of the application process AP02.

At this stage of the initialization process, if the application AP02 opens a first transaction the transaction identifier assigned will have the first three fields as follows:

X+2, PI'02, 1

The value X+2 assigned to the first field SID0 distinguishes transactions opened in the station NMS from transactions opened, for example, in the station S1 for which the first field SID1 has the value X+1.

At this stage the transactions opened by the application processes AP01, AP02, AP03 of the station NMS can modify only data in the same station, since the data manager detects that the identifiers of these transactions include a temporary value PI'02 in the second field. It therefore prohibits any reading or writing by them in other stations and any writing of data stored in the station and in the non-volatile memory D. Likewise for the transactions opened by the application processes AP11, AP12, AP13 of the station S1.

Figure 5:
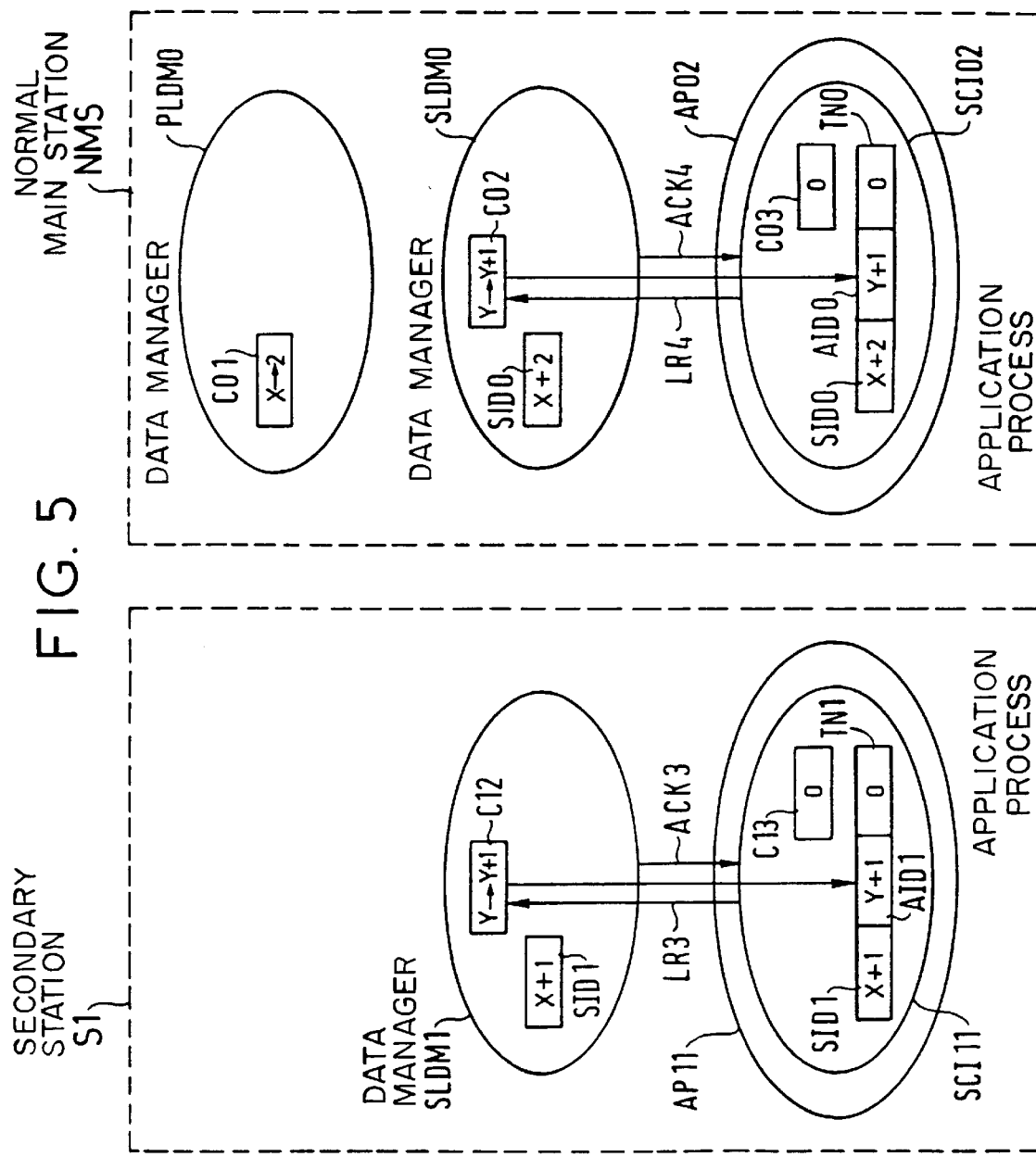

FIG. 5 is a diagrammatic representation of the same part of this example system, illustrating the completion of the initialization phase of an application process. By way of example, FIG. 5 shows the setting up of a relation between the application process AP11 and the second manager process SLDM1 and the setting up of a relation between the application process AP02 and the second manager process SLDM0. The application process AP11 sends a link set-up request LR3 to the second manager process SLDM1. This request causes incrementing of the counter value Y stored in the memory C12 of the processor SLDM. The incremented value Y+1 is not backed up in the non-volatile memory. It is sent to the application process AP11 which requested the link, with an acknowledgement ACK3 indicating that the link has been set up. The incremented value Y+1 is assigned to the interface SCI11 of the application process AP11 and thereafter constitutes the value of the second field AID1 of the identifiers of the transactions opened at the request of the application process AP11.

Likewise, in the normal main station NMS, the application process AP02 submits a link set-up request LR4 to the manager process SLDM0. This request causes incrementing of the counter value Y stored in the memory C02 of that process. This value becomes Y+1. It is not backed up in the non-volatile memory, but is sent with an acknowledgement ACK4 to the application process AP02. This value thereafter constitutes the value assigned to the second field AID0 of the identifiers of the transactions opened at the request of the application process AP02.

A similar procedure is used to set up links between the application processes AP12, AP13 and the manager process SLDM1. The three successive incrementations of the counter value contained in the memory C12 lead to the value 2 being assigned to the second field of the identifiers of the transactions opened by the application process AP12 and the value 3 being assigned to the second field of the identifiers of the transactions opened by the process AP13. A similar procedure is used for the application processes AP01 and AP03 in the station NMS. The order in which the application processes request the setting up of a link to the manager process SLDM in the same station is obviously of no importance, and merely modifies the value of the second field AID.

Figure 6:
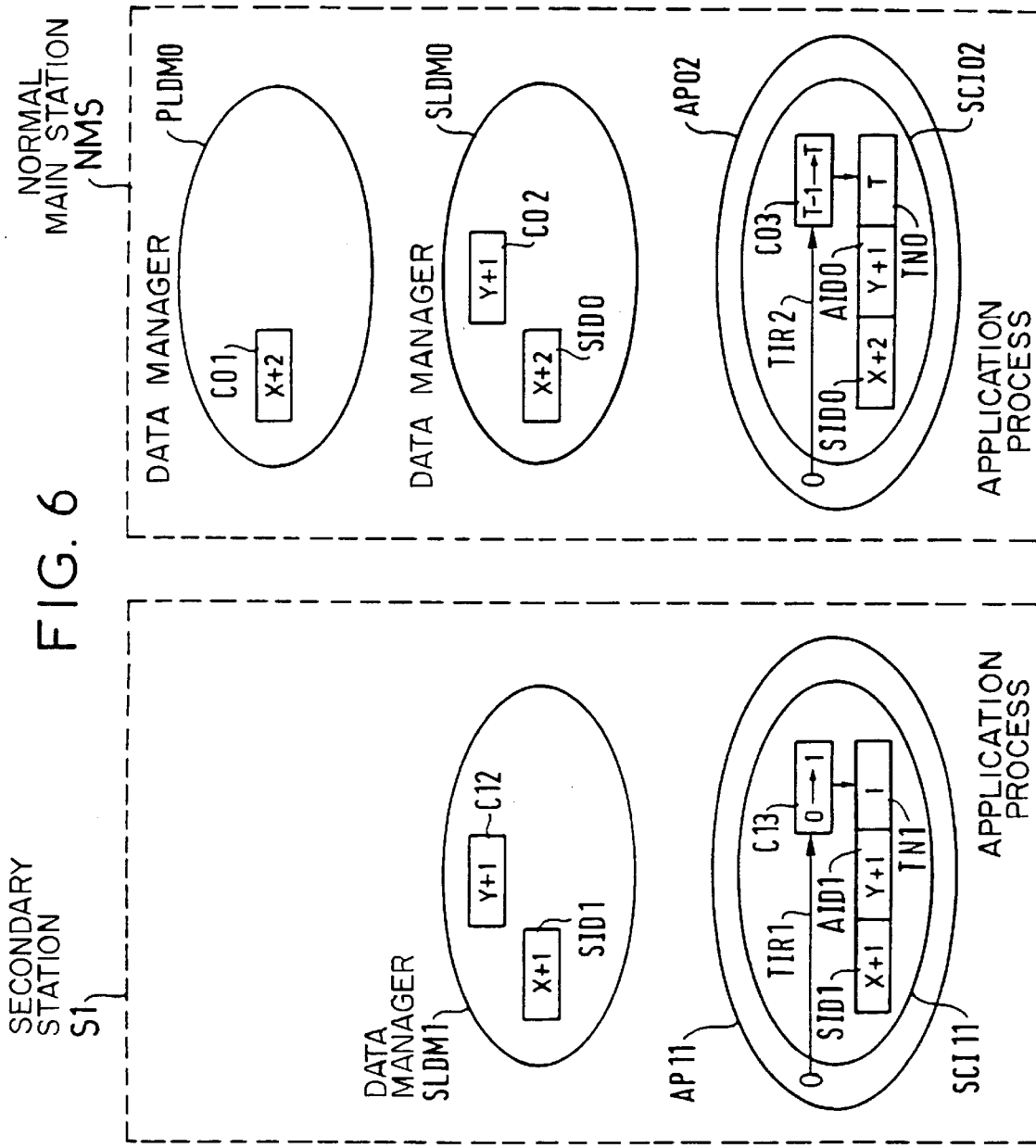

FIG. 6 is a diagrammatic representation of the same part of this example system, illustrating the assignment of transaction identifiers when the initialization phase has ended for the second manager processes SLDM0 and SLDM1 and for the application processes AP11 and AP02 considered by way of example. In this example, the application process AP11 sends a transaction opening request TIR1 for the first time to its interface SCI11, which then increments the counter value contained in the memory C13 specific to it. In this example, the counter value goes from 0 to 1 because this is the first opening request since the most recent start or restart. This value is assigned to the third field TN1 of the identifier of the transaction opened as a consequence of the request TIR1. The first three fields of that identifier are therefore:

X+1, Y+1, 1

For other, subsequent transaction openings the counter value stored in the memory C13 is incremented by one unit each time, enabling the various transactions opened by the same application process AP11 to be distinguished.

In a similar manner, in the application process AP02 a Tth transaction opening request TIR2 causes incrementing of the counter value stored in the memory C03 specific to the interface SCI02. In this example this value therefore changes from T-1 to T. It is assigned to the third field TN0 of the identifier of the transaction opened as a result of the request TIR2.

Note that the counter values of the SCI interfaces are not backed up in the non-volatile memory D.

Figure 7:
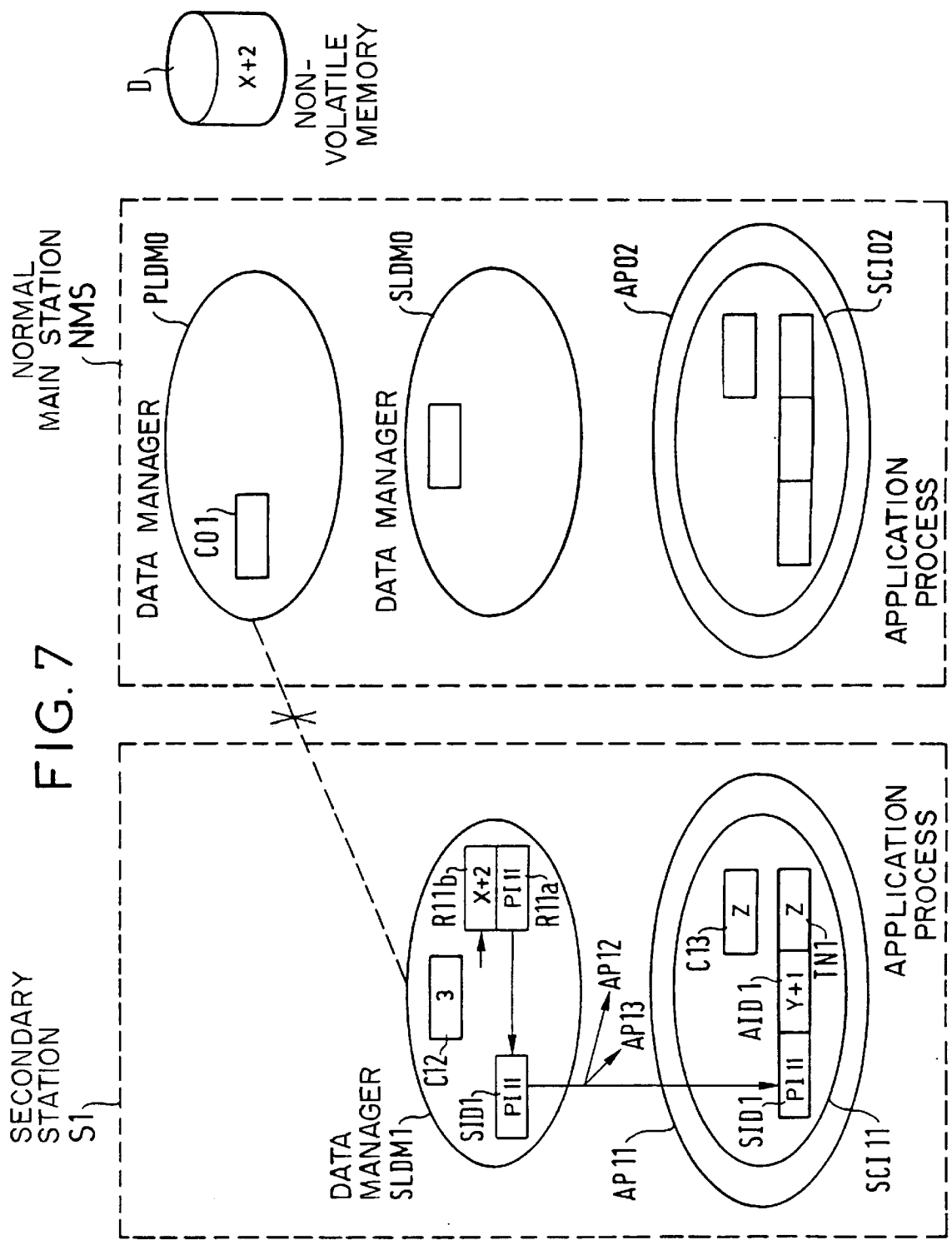
FIG. 7 shows the same part of the example system, illustrating the implementation of the method of the invention when a second manager process detects the breaking of a link previously set up between the second manager process and the first manager process because of a failure of the main station.

FIG. 7 shows the same part of the example system, illustrating failure of the normal main station NMS. This failure causes the loss of all the data stored in the processes PLDM0, SLDM0, AP02 in particular. However, the counter value X+2 that was stored in the memory C01 at the time of the failure is backed up in the non-volatile memory D.

The failure breaks the links between the first manager process PLDM0 and the second manager process of each station, in particular the process SLDM1 of the station S1. Recovery of the transactions is not assured for however long the standby process PLDM0' on the station SMS is not activated and the links between the processes SLDM and this process reconnected. Accordingly, reading or writing of data outside the station in which a transaction was opened and reading or writing of data backed up on the disk must be prohibited.

To be able to detect the transactions that are in this situation, the method of the invention consists in substituting a temporary value identifiable as such for the value assigned to a second manager process SLDM by the first manager process PLDM0; it additionally consists in repeating the initialization phase of each of the second manager processes SLDM, but without sending the indicator INIT to indicate that at least one link has already been set up since the last starting or restarting of each second process SLDM.

In the case of the station S1, the value assigned to the first field of the identifiers during the SLDM1 initialization phase described previously was X+2. The process SLDM1 sets aside this value X+2 by writing it into a register R11b. It replaces it with a temporary value identifiable as such by reading the value PI11 in the register R11a. This temporary value is assigned to the first field SID1 of the transaction identifier. This temporary value is broadcast by the manager process SLDM1 to the three application processes AP11, AP12, AP13.

Figure 8:
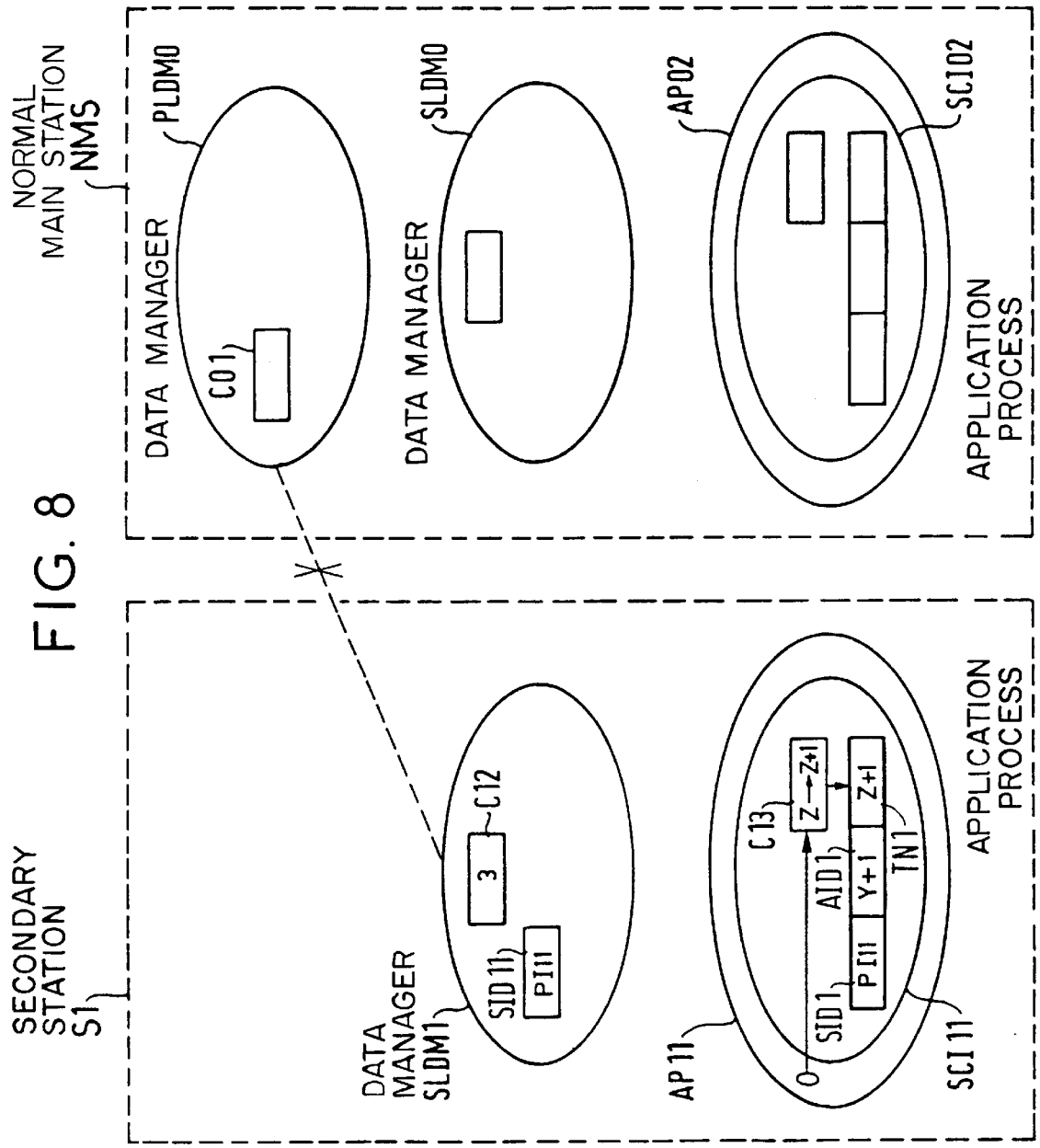
FIG. 8 shows the same part of the example system, illustrating the assignment of an identifier to a transaction during the time in which the link is down.

FIG. 8 is a diagrammatic representation of the same part of this example system, illustrating the case of a transaction that is opened while the link between the manager processes SLDM1 and PLDM0 is down. If the application process AP11 requests the opening of a transaction, for example, the interface SCI11 increments by one unit the value Z contained in the memory C13. The value of the first three fields of the transaction identifier assigned to that transaction is therefore as follows:

PI11, Y+1, Z+1

Because of the temporary value of the first field, this transaction cannot access data outside the station S1 or in the non-volatile memory D.

Figure 9:
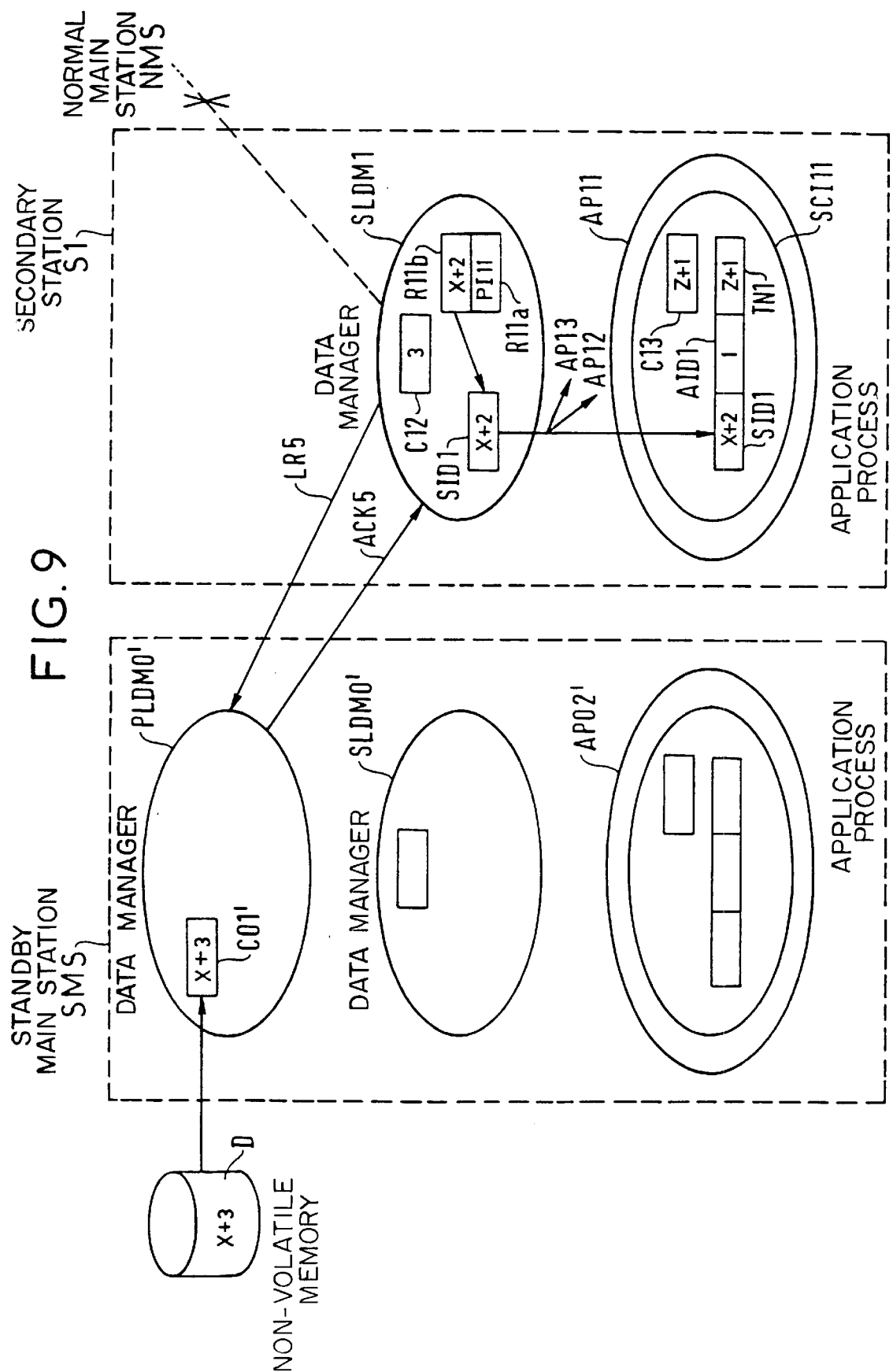
FIG. 9 is a diagrammatic representation of part of the example system, illustrating the restoration of operation of the system after a failure affecting the station executing the first data manager process.

FIG. 9 shows the standby main station SMS and the station S1 to illustrate the restoration of complete functioning of the system after failure of the normal main station NMS. At the time of this failure the counter value stored in the memory C01 had reached X+3 because the three secondary stations S1, S2, S3 had been counted. When the standby main station SMS is started, to take over from the normal main station NMS, the counter value X+3 that is stored in the non-volatile memory D is transferred into the memory C01' specific to the first manager process PLDM0' that is to replace the defunct first manager process PLDM0.

In the station S1, the second manager process SLDM1 sends a link set-up request LR5. This request is not accompanied by an indicator INIT because the second process SLDM1 knows that a link had been previously set up with a first manager process PLDM0. Because the indicator INIT is absent, the request LR6 does not cause incrementing of the counter value X+3. It is not necessary to increment this counter value because the station is neither a new station started for the first time or a station already counted but restarted after a failure necessitating incrementation of the value of the first field of the identifiers to distinguish the transactions opened after the failure from the transactions opened before the failure by the defunct processes.

The request LR6 merely sets up a link and sends an acknowledgement ACK5 to the second manager process SLDM1. When the latter confirms that a link is reconnected, it can again use the value X+2 previously assigned to it to distinguish the transactions opened by an application process of the station S1. It therefore reads the value X+2 that had been set aside in the register R11b of the process SLDM1 and assigns it to the first field SID1 of the transaction identifier, broadcasting it to all the application processes with which a link has been set up, i.e. to the application processes AP11, AP12, AP13. The counter value 3 stored in the memory C12 of the second process SLDM1 is not modified.

The value 1 assigned to the second field AID1 is not modified. The counter value stored in the memory C13 is equal to Z+1 in this example, and is not affected by the failure of the normal main station NMS. The next transaction opened in the station S1 will have an identifier with the first three fields as follows:

X+2, 1, Z+2

In a similar manner the value of the first two fields of the transaction indicator is restored in all the other application processes in the system.

Figure 10:
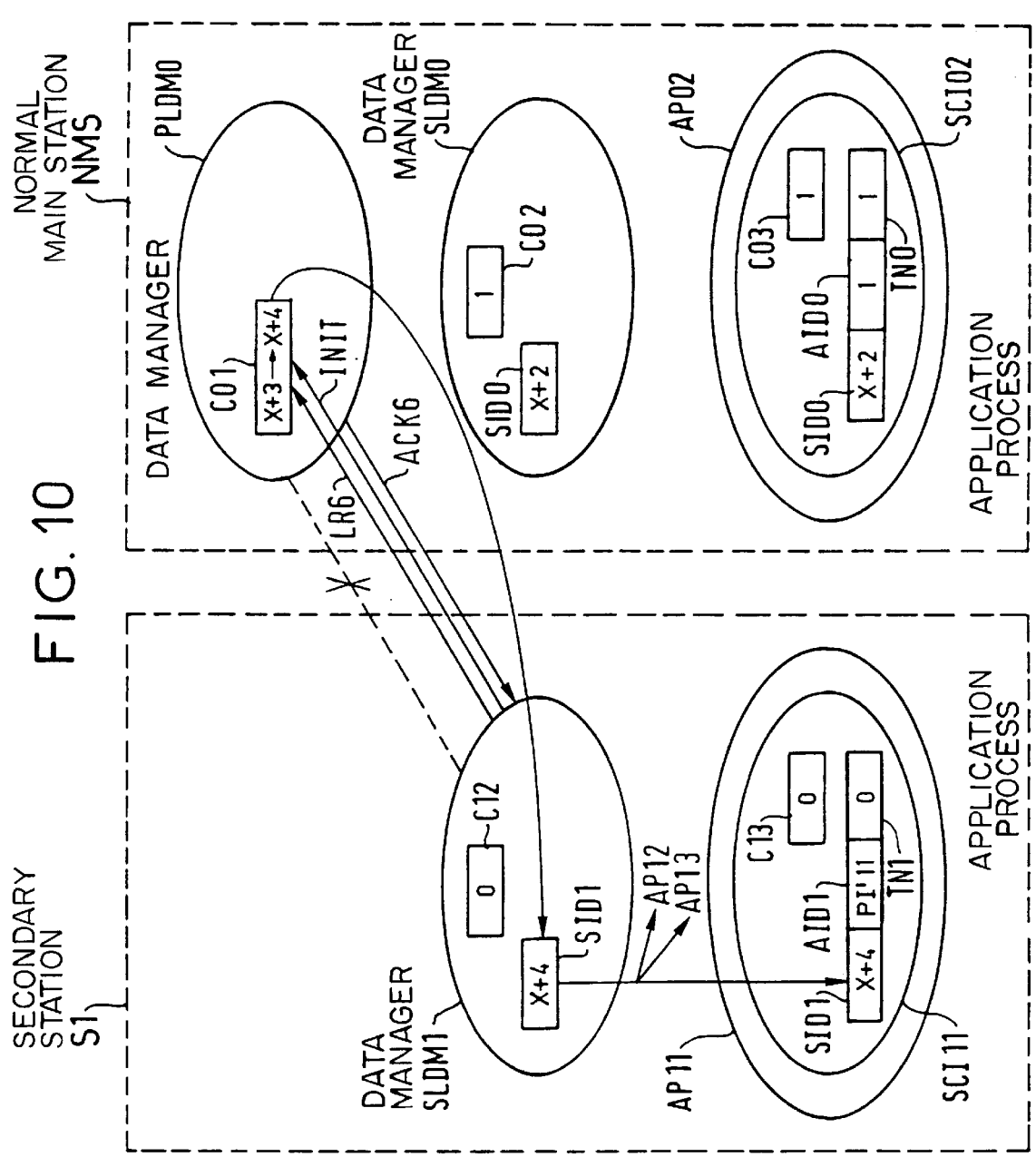
FIG. 10 is a diagrammatic representation of part of the example system, illustrating the restoration of the operation of a station other than that including the first manager process, after a failure that has affected that station.

FIG. 10 shows the situation in which the station S1 is restarted because it has failed. Until the initialization phase of the second manager process SLDM1 and/or the initialization phase of an application process AP11 are completed, temporary values PI11 and PI'11 are assigned to the first and second fields SID1 and AID1 of the transaction identifier, as described with reference to FIG. 2. The memories C12 and C13 are reset to zero. Transaction identifiers can be assigned to transactions immediately, but these transactions can access only data stored in the station S1.

FIG. 10 shows the step of initializing the second manager process SLDM1. The latter sends a link set-up request LR6 accompanied by an indicator INIT indicating that this is a first request since the restarting of the station S1. The first manager process PLDM0 sends back an acknowledgement ACK6. The counter value, X+3 in this example, that is stored in the memory C01 of the first manager process PLDM0 is incremented to X+4 because the request LR6 is accompanied by an indicator INIT. The first manager process PLDM0 assigns the new counter value X+4 to the second manager process SLDM1 to constitute the value of the first field SID1.

The process SLDM1 broadcasts this value to the application processes AP11, AP12, AP13. The value X+4 distinguishes transactions opened after restoration of operation of the station S1 from transactions opened before the failure of the station S1 and that would still have been in the process of being closed, despite the fact that the counter value restarts from zero.

The values stored in the memories C02 and C03 of the main station NMS and the values assigned to the fields SID0, AID0 and TN0 are immaterial and are not affected. The restarting of the station S1 then entails completing the initialization phase of the application processes AP1, AP12, AP13, as described with reference to FIG. 5.

In a preferred embodiment, each transaction identifier includes a fourth field containing an error detection word determined by applying an algorithm known in itself to the data constituting the first, second and third fields. This algorithm can generate the remainder of division by a fixed polynomial, for example. The error detection word enables the various programs managing the transactions to detect an identifier that is invalid because of a bug in an application process.

There is claimed:

1. Method of assigning a unique identifier to each transaction in a device including a non-volatile memory and a plurality of stations, each station executing a plurality of application processes; all the stations and the non-volatile memory being connected by a communication network assuring the integrity of communications;

which method consists in:
 determining a first field of said identifier, having:
  either a temporary value identifiable as such and unique to the set of stations, if opening of the transaction is requested during a first initialization phase;
  or a value assigned by a first data manager process common to all the stations if the opening is requested after said first initialization phase; said first manager process further implementing a transaction recovery protocol known in itself;
 determining a second field having:
  either a temporary value identifiable as such and unique to the station executing the requesting application process that requested the opening of the transaction if the opening is requested during a second initialization phase;
  or a value assigned by a second data manager process, said second data manager process being specific to the station that is executing the requesting process, if the opening of the transaction is requested after said second initialization phase;
 determining a third field by incrementing by one unit a counter value specific to said requesting process;

wherein said value assigned by said first manager process is the result of incrementing by one unit a first counter value specific to said first manager process and backed up in said non-volatile memory, said counter value being restored after each failure of the station executing said first manager process;

wherein said value assigned by said second manager process is the result of incrementing by one unit a second counter value specific to said manager process;

wherein said first initialization phase is completed for a given second manager process when it has set up a link with said first manager process; and wherein said second initialization phase is completed for a given application process when it has set up a link with said second manager process specific to the station in which said application process is executed.

2. Method according to claim 1 wherein said first initialization phase for a given second data manager consists in:
    said second manager process requesting the setting up of a link between said second manager process and said first manager process, said request being accompanied by an indicator for distinguishing whether a link of such kind has already been set up since the last starting of said second manager process;
    setting up a link of this kind; and
    if said indicator indicates that said link is set up for the first time:
        incrementing by one unit said counter value stored in the memory specific to said first manager process;
        backing up the incremented value by writing it in said non-volatile memory; and then
        supplying the counter value to the second manager process that requested a link.

3. Method according to claim 1 wherein said second initialization phase for a given application process consists in:
    said application process requesting the setting up of a link between said application process and said second manager process that is specific to the station in which said application process is executed;
    setting up a link of this kind; and
    incrementing by one unit the counter value specific to said second manager process.

4. Method according to claim 1, further consisting in determining a fourth field containing an error detection word by applying an algorithm known in itself to the data constituting the other three fields.

5. System of assigning a unique identifier to each transaction in a device including a non-volatile memory and a plurality of stations, each station executing a plurality of application processes; all the stations and the non-volatile memory being connected by a communication network assuring the integrity of communications;
    which system includes:
        means for determining a first field of said identifier, having:
            either a temporary value identifiable as such and unique to the set of stations, if opening of the transaction is requested during a first initialization phase;
            or a value assigned by a first data manager process common to all the stations if the opening is requested after said first initialization phase; said first manager process further implementing a transaction recovery protocol known in itself;
        means for determining a second field having:
            either a temporary value identifiable as such and unique to the station executing the requesting application process that requested the opening of the transaction if the opening is requested during a second initialization phase;
            or a value assigned by a second data manager process, said second data manager process being specific to the station that is executing the requesting process, if the opening of the transaction is requested after said second initialization phase;
        means for determining a third field by incrementing by one unit a counter value specific to said requesting process;

wherein said value assigned by said first manager process is the result of incrementing by one unit a first counter value specific to said first manager process and backed up in said non-volatile memory, said counter value being restored after each failure of the station executing said first manager process;

wherein said value assigned by said second manager process is the result of incrementing by one unit a second counter value specific to said manager process;

wherein said first initialization phase is completed for a given second manager process when it has set up a link with said first manager process; and wherein said second initialization phase is completed for a given application process when it has set up a link with said second manager process specific to the station in which said application process is executed.

6. System according to claim 5 wherein a given second data manager includes means for, during said first initialization phase:
    causing said second manager process to request the setting up of a link between said second manager process and said first manager process, said request being accompanied by an indicator for distinguishing whether a link of such kind has already been set up since the last starting of said second manager process;
    setting up a link of this kind; and
    if said indicator indicates that said link is set up for the first time:
        incrementing by one unit said counter value stored in the memory specific to said first manager process;
        backing up the incremented value by writing it in said non-volatile memory; and then
        supplying the counter value to the second manager process that requested a link.

7. System according to claim 5 wherein each application process includes means for, during said second initialization phase:
    causing said application process to request the setting up of a link between said application process and said second manager process that is specific to the station in which said application process is executed;
    setting up a link of this kind; and
    incrementing by one unit the counter value specific to said second manager process.

8. System according to claim 5, further comprising means for determining a fourth field containing an error detection word by applying an algorithm known in itself to the data constituting the other three fields.

* * * * *